(12) United States Patent
Luo et al.

(10) Patent No.: US 10,698,872 B2
(45) Date of Patent: Jun. 30, 2020

(54) DATA COLLECTION MANAGEMENT SYSTEM, METHOD, AND RECORDING MEDIUM ENCODED WITH A PROGRAM FOR MANAGING COLLECTION OF DATA OF PLURALITY OF MACHINES

(71) Applicant: FANUC CORPORATION, Minamitsuru-gun, Yamanashi (JP)

(72) Inventors: Wei Luo, Yamanashi (JP); Junichi Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/922,075

(22) Filed: Mar. 15, 2018

(65) Prior Publication Data
US 2018/0285395 A1 Oct. 4, 2018

(30) Foreign Application Priority Data
Mar. 31, 2017 (JP) .................................. 2017-072112

(51) Int. Cl.
*G06F 17/00* (2019.01)
*G06F 16/22* (2019.01)
(Continued)

(52) U.S. Cl.
CPC ....... *G06F 16/221* (2019.01); *G05B 19/4183* (2013.01); *G06F 16/2282* (2019.01); *G05B 19/40938* (2013.01); *Y02P 90/30* (2015.11)

(58) Field of Classification Search
CPC .. G06F 12/0253; G06F 16/22; G06F 17/5045; G06F 16/29; G06F 12/02; G06F 12/0246
See application file for complete search history.

(56) References Cited

U.S. PATENT DOCUMENTS

2005/0144264 A1 6/2005 Gruhn et al.
2015/0256597 A1* 9/2015 Gessner ................ G06Q 10/06
709/217

FOREIGN PATENT DOCUMENTS

CN 1906550 1/2007
CN 102356645 2/2012
(Continued)

OTHER PUBLICATIONS

Notification of Reasons for Refusal dated Nov. 6, 2018 in corresponding Japanese Application No. 2017-072112.
(Continued)

*Primary Examiner* — Truong V Vo
(74) *Attorney, Agent, or Firm* — Wenderoth, Lind & Ponack, L.L.P.

(57) ABSTRACT

To alleviate the work load of managing a plurality of machines more appropriately. A data collection management system (1) includes a data collection management device (10) that manages acquisition of measurement data of a plurality of machine tools (20). The data collection management device (10) includes: a setting storage unit (16) that stores connection settings of the plurality of machine tools (20) and setting of the type of measurement data measured in each of the machine tools (20); a setting unit (11b) that sets the connection settings and the type of the measurement data to a measurement tool corresponding to each of the machine tools (20); and an execution management unit (11c) that executes measurement of each of the machine tools (20) using the measurement tool according to the settings performed by the setting unit (11b).

11 Claims, 10 Drawing Sheets

(51) Int. Cl.
*G05B 19/418* (2006.01)
*G05B 19/4093* (2006.01)

(56) References Cited

FOREIGN PATENT DOCUMENTS

| EP | 2 490 161   | 8/2012  |
|----|-------------|---------|
| JP | 9-248739    | 9/1997  |
| JP | 11-338535   | 12/1999 |
| JP | 2009-48324  | 3/2009  |
| JP | 2016-162402 | 9/2016  |

OTHER PUBLICATIONS

Office Action dated Jul. 23, 2019 in CN Patent Application No. 201810258610.X.
Office Action dated Dec. 4, 2019 in DE Patent Application No. 102018204224.1.

* cited by examiner

| MACHINE NAME | Machine1 |
| SAVE NAME | save1 |
| SAVE DIRECTORY | C:¥ |
| MEASUREMENT SETTING FILE | C:¥example¥sample.sdt |
| IP ADDRESS | 000.0.0.0 |
| PORT NUMBER | 8000 |
| TIMEOUT | 2 |

OK  CANCEL

FIG. 4

| | MACHINE NAME | IP ADDRESS | PORT NUMBER | TIMEOUT | MEASUREMENT SETTING FILE | SAVE NAME | SAVE DIRECTORY |
|---|---|---|---|---|---|---|---|
| ☑ | Machine1 | 000.0.0.0 | 8000 | 2 | C:¥example¥sample... | save1 | C:¥ |
| ☑ | Machine2 | 000.0.0.1 | 8000 | 2 | C:¥example¥sample... | save2 | C:¥ |
| ☐ | Machine3 | 000.0.0.2 | 8000 | 2 | C:¥example¥sample... | save3 | C:¥ |

BLUE　　RED

FILE　HELP

ADD SETTING | DELETE SETTING | START MEASUREMENT | STOP MEASUREMENT

| | MACHINE NAME | IP ADDRESS | PORT NUMBER | TIMEOUT | MEASUREMENT SETTING FILE | SAVE NAME | SAVE DIRECTORY |
|---|---|---|---|---|---|---|---|
| ☑ | Machine1 | 000.0.0.0 | 8000 | 2 | C:¥example¥sample... | save1 | C:¥ |
| ☑ | Machine2 | 000.0.0.1 | 8000 | 2 | C:¥example¥sample... | save2 | C:¥ |
| ☐ | Machine3 | 000.0.0.2 | 8000 | 2 | C:¥example¥sample... | save3 | C:¥ |

GREEN — (rows 1)
RED — (row 2)

FILE  HELP

[ADD SETTING] [DELETE SETTING] [START MEASUREMENT] [STOP MEASUREMENT]

DATA COLLECTION MANAGEMENT SYSTEM, METHOD, AND RECORDING MEDIUM ENCODED WITH A PROGRAM FOR MANAGING COLLECTION OF DATA OF PLURALITY OF MACHINES

This application is based on and claims the benefit of priority from Japanese Patent Application No. 2017-072112, filed on 31 Mar. 2017, the content of which is incorporated herein by reference.

BACKGROUND OF THE INVENTION

Field of the Invention

The present invention relates to a data collection management system, method, and recording medium encoded with a program for managing collection of data of a plurality of machines.

Related Art

Conventionally, a system that manages a plurality of machines using one management device is known. For example, in a monitoring system disclosed in Patent Document 1, a plurality of data collection PCs are connected to a plurality of semiconductor manufacturing apparatuses in one-to-one correspondence. Each data collection PC collects processing state data of each semiconductor manufacturing apparatus. Moreover, one monitoring PC monitors the processing state data collected by the plurality of data collection PCs.

Patent Document 1: Japanese Unexamined Patent Application, Publication No. 2009-48324

SUMMARY OF THE INVENTION

Patent Document describes that information (an IP address or the like) on the data collection PC and monitoring items (temperature and the like) of the semiconductor manufacturing apparatus are registered in the monitoring PC. However, Patent Document 1 makes no description relating to the monitoring PC performing setting of a monitoring target machine, such as setting of monitoring items. When data of a plurality of machines is collected, it may be necessary to set a measurement item or the like serving as a data collection target for respective machines. In the technique disclosed in Patent Document 1, in such a case, it is necessary to perform setting for respective machines. That is, in the conventional technique, the work load for managing a plurality of machines is not alleviated appropriately.

An object of the present invention is to alleviate the work load of managing a plurality of machines more appropriately.

(1) A data collection management system (for example, a data collection management system 1 to be described later) of the present invention is
a data collection management system including a data collection management device (for example, a data collection management device 10 to be described later) that manages acquisition of measurement data of a plurality of machine tools (for example, a machine tool 20 to be described later), wherein
the data collection management device includes:
a setting storage unit (for example, a storage unit 16 to be described later) that stores connection settings with the plurality of machine tools and setting of types of measurement data measured in each of the machine tools;
a setting unit (for example, a setting management unit 11*b* to be described later) that sets the connection settings and the types of the measurement data to a measurement tool corresponding to each of the machine tools; and
an execution management unit (for example, a measurement tool execution management unit 11*c* to be described later) that executes measurement of each of the machine tools using the measurement tool according to the settings performed by the setting unit.

(2) In the data collection management system according to (1), the data collection management device may include:
a measurement data acquisition unit (for example, a measurement tool execution management unit 11c to be described later) that acquires the measurement data on the machine tool.

(3) In the data collection management system according to (1) or (2), the data collection management device may include the measurement tool corresponding to each of the machine tools.

(4) The data collection management system according to (1) or (2) may further include an information processing device (for example, information processing devices 10-1 to 10-*n* to be described later) that manages acquisition of the measurement data on one or some of the machine tools among the plurality of machine tools, and the information processing device may include the measurement tool corresponding to one or some of the machine tools among the plurality of machine tools.

(5) In the data collection management system according to any one of (1) to (4), the data collection management device may include:
a display control unit (for example, a UI display control unit 11*a* to be described later) that displays an interface screen for controlling the setting unit performing the connection settings and the setting of the types of the measurement data to the measurement tool and controlling the measurement tool executing measurement on the respective machine tools, and the display control unit may display the machine tools serving as measurement targets on the interface screen as a list, and when an item of the machine tools displayed as the list is selected, processes related to setting on the measurement tool corresponding to the machine tool, connection by communication with the machine tool, or measurement on the machine tool may be executed.

(6) In the data collection management system according to (5), the display control unit may receive addition and deletion of the machine tool serving as the measurement target on the interface screen.

(7) A data collection management method of the present invention is
a data collection management method executed in a data collection management system including a data collection management device that manages acquisition of measurement data of a plurality of machine tools, wherein
the data collection management device executes:
a setting step of setting connection settings with the plurality of machine tools and setting types of measurement data measured in each of the machine tools to a measurement tool corresponding to each of the machine tools; and
an execution management step of executing measurement on each of the machine tools using the measurement tool according to the settings performed in the setting step.

(8) A program of the present invention is a program for causing a computer that forms a data collection management device that manages acquisition of measurement data on a plurality of machine tools to realize:

a setting function of setting connection settings of the plurality of machine tools and setting types of measurement data measured on each of the machine tools to a measurement tool corresponding to each of the machine tools; and an execution management function of executing measurement on each of the machine tools using the measurement tool according to the settings performed in the setting step.

According to the present invention, it is possible to alleviate the work load of managing a plurality of machines more appropriately.

BRIEF DESCRIPTION OF THE DRAWINGS

FIG. 4 is a schematic diagram illustrating an example of a connection setting screen.

FIG. 5B is a schematic diagram illustrating an example of a connection status display screen.

FIG. 5C is a schematic diagram illustrating an example of a connection status display screen.

DETAILED DESCRIPTION OF THE INVENTION

Hereinafter, an embodiment of the present invention will be described with reference to the drawings.
[Configuration]

Figure 1:
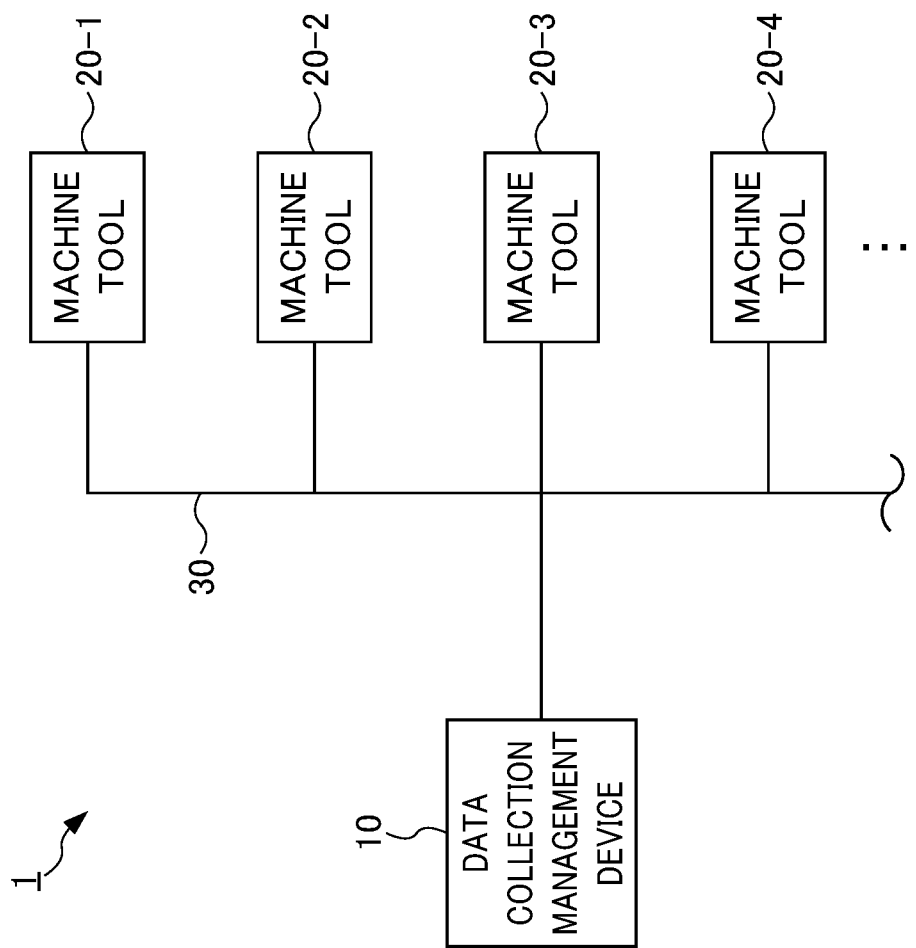
FIG. 1 is a schematic diagram illustrating a system configuration of a data collection management system according to an embodiment of the present invention.

FIG. 1 is a schematic diagram illustrating a system configuration of a data collection management system 1 according to an embodiment of the present invention.

As illustrated in FIG. 1, the data collection management system 1 includes a data collection management device 10 and a plurality of machine tools 20-1 to 20-$n$ ($n$ is an integer of 2 or more). The data collection management device 10 and the plurality of machine tools 20-1 to 20-$n$ can communicate with each other via a network 30 such as a cable or wireless LAN. The data collection management device 10 and the plurality of machine tools 20-1 to 20-$n$ may be connected by a communication cable such as a universal serial bus (USB) cable. Hereinafter, the plurality of machine tools 20-1 to 20-$n$ will be referred to simply as a machine tool 20 when they are not distinguished from each other.

The data collection management device 10 is configured as an information processing device such as a personal computer (PC) or a server device. The data collection management device 10 includes measurement tools so as to correspond to the machine tools 20-1 to 20-$n$, the measurement tools executing setting of connection to each of the machine tools 20-1 to 20-$n$, setting of the content of measurement data (the types of measurement data, a measurement method, and the like), and collection of the measurement data. In the present embodiment, the measurement tool is installed in the data collection management device 10 as an application program. The data collection management device 10 has an integrated management function of managing the respective measurement tools corresponding to the machine tools 20-1 to 20-$n$ in an integrated manner. That is, with the integrated management function, the data collection management device 10 manages setting of connection to the plurality of measurement tools, setting of the content of measurement data (the types of measurement data, a measurement method, and the like), collection of the measurement data, saving of various settings, and saving of the measurement data in a centralized manner.

The machine tool 20 is configured as a numerically controlled (NC) machine tool or an industrial robot installed in a manufacturing line or the like. In the present embodiment, each of the machine tools 20-1 to 20-$n$ includes a spindle motor and a servomotor and acquires the position of a machine moving part (a servo shaft) driven by the servomotor and the position of a main shaft (a spindle shaft) driven by the spindle motor as one piece of measurement data.

[Configuration of Data Collection Management Device 10]

Figure 2:
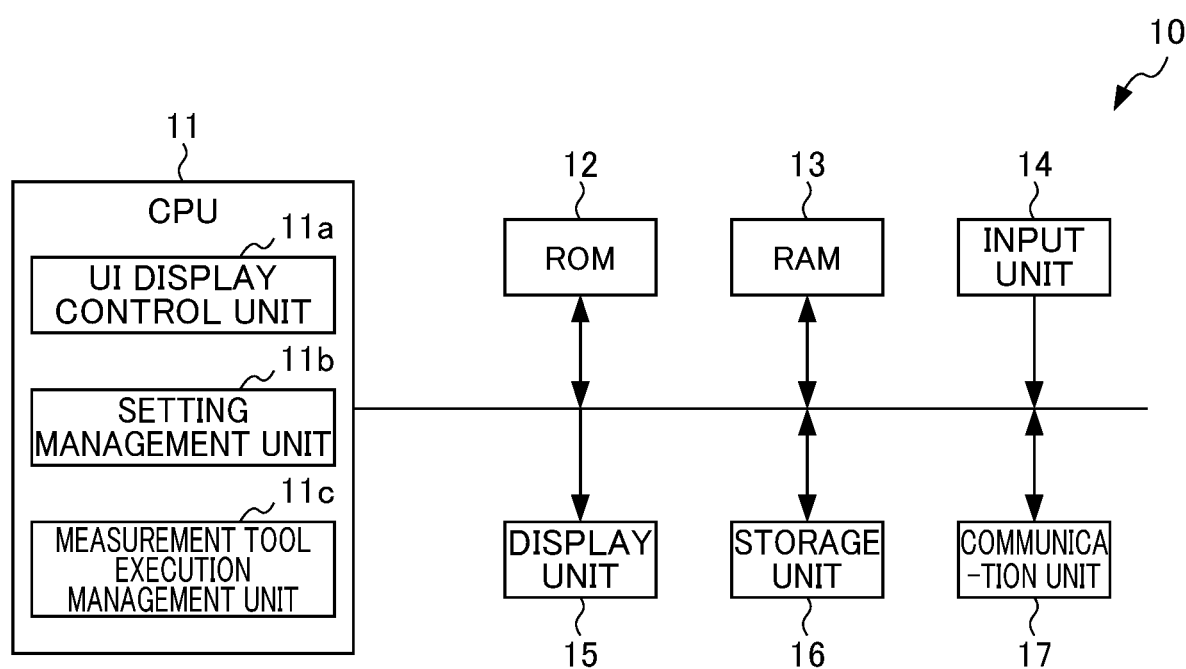
FIG. 2 is a block diagram illustrating a configuration of a data collection management device.

Next, a configuration of the data collection management device 10 will be described. FIG. 2 is a block diagram illustrating a configuration of the data collection management device 10. As illustrated in FIG. 2, the data collection management device 10 includes a central processing unit (CPU) 11, a ROM 12, a RAM 13, an input unit 14, a display unit 15, a storage unit 16, and a communication unit 17.

The CPU 11 controls the entire data collection management device 10 by executing various programs stored in the storage unit 16. For example, the CPU 11 executes a program for a process of managing the plurality of measurement tools in an integrated manner (hereinafter, this process will be referred to as an "integrated management process"). When a program for the integrated management process is executed, a UI display control unit 11$a$, a setting management unit 11$b$, and a measurement tool execution management unit 11$c$ are formed in the CPU 11 as functional configuration units.

The UI display control unit 11$a$ displays various display screens such as a menu screen, a setting screen, and a status display screen of the integrated management process. Moreover, the UI display control unit 11$a$ receives the input of a user's operation on various display screens.

The setting management unit 11$b$ performs various settings of individual measurement tools, such as setting of connection of the machine tool 20 to the measurement tool and setting of the content of measurement data (the types of measurement data, a measurement method, and the like) according to the user's input. Various settings of individual measurement tools are stored in a measurement setting file. For example, as various settings of individual measurement tools, a position control command value from a programmable machine controller (PMC), a sensor detection value, the number of pieces of measurement data, a sampling period, and the like are set with regard to the servo shaft and the spindle shaft. Moreover, signals associated with serial communications for connecting the PMC and various I/Os may be used as a measurement target. The sampling period is set for the position control command value and the sensor detection value or is set for the individual serial communication signals.

The setting management unit 11b performs various settings for the integrated management process, such as selection of the machine tools 20 serving as a management target of the integrated management process and management of a file serving as a setting save destination. Various settings for the integrated management process are stored in a management file. Detailed content of various settings for the integrated management process will be described later.

The measurement tool execution management unit 11c activates a measurement tool for the machine tool 20 which is a management target of the integrated management process. The measurement tool execution management unit 11c executes the acquisition of measurement data and saving of the acquired measurement data by controlling the machine tool using the measurement tool by referring to the types of the measurement data set for respective measurement tools. The measurement data is stored in measurement data save files set for respective measurement tools.

Various system programs for controlling the data collection management device 10 are written in advance in the ROM 12. The RAM 13 is configured as a semiconductor memory such as a dynamic random access memory (DRAM) and stores data generated when the CPU 11 executes various processes. The input unit 14 is configured as an input device such as a keyboard, a mouse, or a touch sensor and receives the user's input of various pieces of information to the data collection management device 10.

The display unit 15 is configured as a display device such as a liquid crystal display (LCD) and displays various processing results of the data collection management device 10. The storage unit 16 is configured as a nonvolatile storage device such as a hard disk or a flash memory and stores programs and the like for the integrated management process. Moreover, the storage unit 16 stores the measurement setting files and the measurement data save files for the respective machine tools 20 and a management file for the integrated management process. The communication unit 17 includes a communication interface that performs signal processing on the basis of a predetermined communication standard such as a cable or wireless LAN or a USB and controls communication performed between the data collection management device 10 and the machine tool 20.

[Examples of Various Display Screens of Integrated Management Process]

Next, examples of various display screens displayed in the integrated management process will be described.

[Connection Management Screen]

Figure 3:
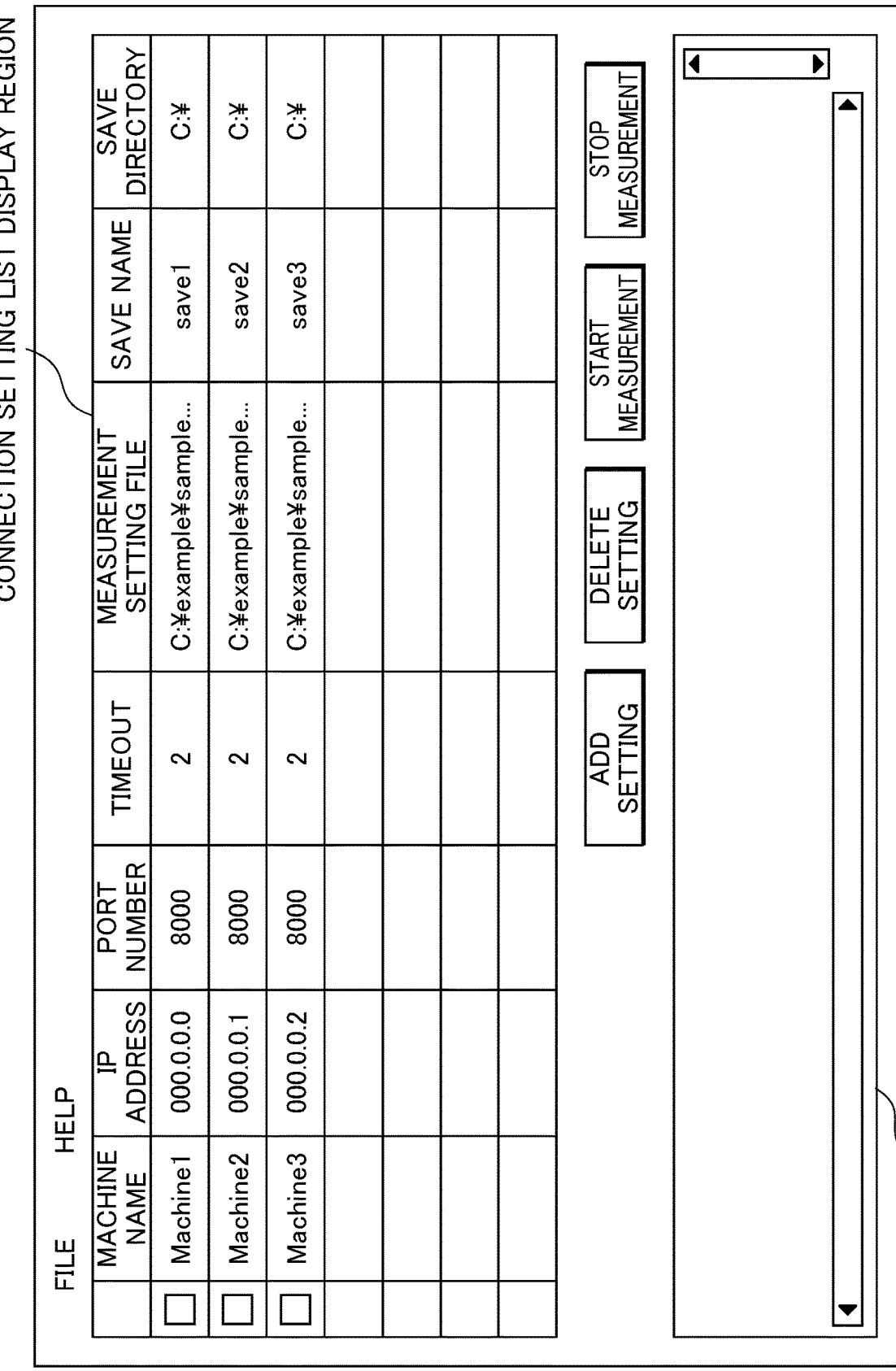
FIG. 3 is a schematic diagram illustrating an example of a connection management screen.

FIG. 3 is a schematic diagram illustrating an example of the connection management screen. The connection management screen is a main screen displayed immediately after the integrated management process is activated and displays the machine tools 20 serving as a management target of the integrated management process, connection settings or data save destinations of respective measurement tools, and the like as a list. As illustrated in FIG. 3, the connection management screen includes menu buttons including "file" and "help", a display region of "connection setting list", buttons of "add setting", "delete setting", "start measurement", and "stop measurement", and an error log display region.

When the "file" menu is selected among the menu buttons, commands of "open", "save", and "save as" for a management file and a command of "exit application (integrated management process)" are displayed so that the commands can be selected. Moreover, when the "help" menu is selected among the menu buttons, "version information" indicating the version of the integrated management process and a "help" command for displaying a help file are displayed so that the commands can be selected.

The names of the machine tools 20 serving as management targets of the integrated management process and the connection settings of the respective machine tools 20 are displayed in the display region of "connection setting list". Moreover, a checkbox is displayed in the display region of "connection setting list" so as to correspond to the name of each machine tool 20. When a check mark is input to the checkbox, a measurement tool corresponding to the machine tool 20 is activated on the basis of the connection setting. Furthermore, the save destinations of the measurement setting file and the measurement data save file are displayed in the display region of "connection setting list" so as to correspond to the name of each machine tool 20. When a user selects (double-clicks) a connection setting, the screen transitions to a connection setting screen for the connection setting.

The "add setting" button is a button for adding a new connection setting for the machine tool 20. When the "add setting" button is operated, the screen transitions to a connection setting screen for performing a new connection setting. The "delete setting" button is a button for deleting the selected connection setting.

The "start measurement" button is a button for starting (activating the measurement tool) measurement on the machine tool 20 being in an online state among the connection settings displayed as the "connection setting list". The "stop measurement" button is a button for stopping (stopping the measurement tool) measurement on the machine tool 20. The error log display region is a region for displaying the details of an error when an error occurs in measurement on the machine tool 20 by the measurement tool.

[Connection Setting Screen]

FIG. 4 is a schematic diagram illustrating an example of the connection setting screen. The connection setting screen is displayed when the "add setting" button is operated or the connection setting is selected and is a display screen for performing a connection setting for the machine tool 20. As illustrated in FIG. 4, respective items of "machine name", "save name", "save directory", "measurement setting file", "IP address", "port number", and "timeout" are displayed in the connection setting screen so that the items can be set.

The "machine name" item is an item for setting the name of the machine tool 20 serving as a management target of the integrated management process. The "save name" item is an item for setting a save file name (a measurement data save file name) when the measurement tool saves measurement data. The "save directory" item is an item for setting a save destination directory name when the measurement tool saves measurement data.

The "measurement setting file" item is an item for setting a file name (a measurement setting file name) that stores various settings of individual measurement tools, such as a connection setting of a measurement tool and the setting of the types of the measurement data. The "IP address" is an item for setting an IP address of the machine tool 20 serving as a management target of the integrated management process. The "port number" is an item for setting a port number of the machine tool 20 serving as a management target of the integrated management process.

The "timeout" is an item for setting the length of a waiting period until the measurement tool can communicate with the machine tool 20. When an "OK" button is operated after these items are set, the connection setting screen is closed by applying the input settings to the measurement setting file. On the other hand, when a "Cancel" button is operated after these items are set, the connection setting screen is closed without applying the input settings to the measurement setting file.

[Connection Status Display Screen]

Figure 5A:
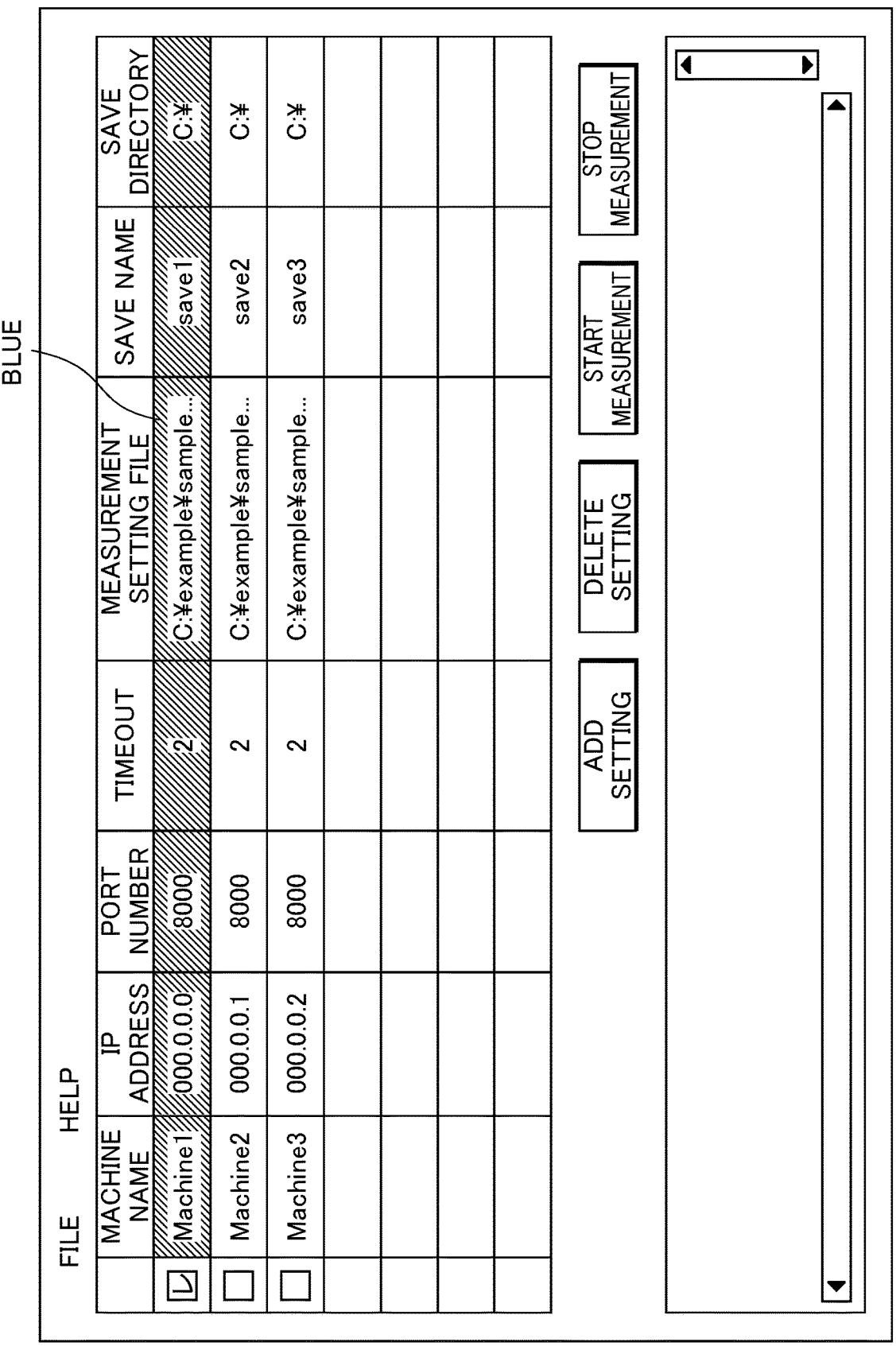
FIG. 5A is a schematic diagram illustrating an example of a connection status display screen.

FIGS. 5A to 5C are schematic diagrams illustrating an example of the connection status display screen. The connection status display screen is a screen for displaying a connection state of the machine tool 20 for which a check mark is input to the checkbox of the "connection setting list" in the connection management screen. The example illustrated in FIG. 5A illustrates a state in which the connection to the machine tool 20 (Machine1) registered on the first row of the "connection setting list" is successful. For the machine tool 20 which has succeeded in connection, an indication for identifying success in connection is displayed (for example, the background is displayed in blue).

The example illustrated in FIG. 5B illustrates a state in which the connection to the machine tool 20 (Machine1) registered on the first row of the "connection setting list" is successful whereas the connection to the machine tool 20 (Machine2) registered on the second row of the "connection setting list" is not successful. For the machine tool 20 which has failed in connection, an indication for identifying a failure in connection is displayed (for example, the background is displayed in red).

The example illustrated in FIG. 5C illustrates a state in which measurement for the machine tool 20 (Machine1) registered on the first row of the "connection setting list" is started. For the machine tool 20 for which the measurement has started, an indication for identifying the start of measurement is displayed (for example, the background is displayed in green).

[Operation]

Next, the operation of the data collection management system 1 will be described.

[Integrated Management Process]

Figure 6:
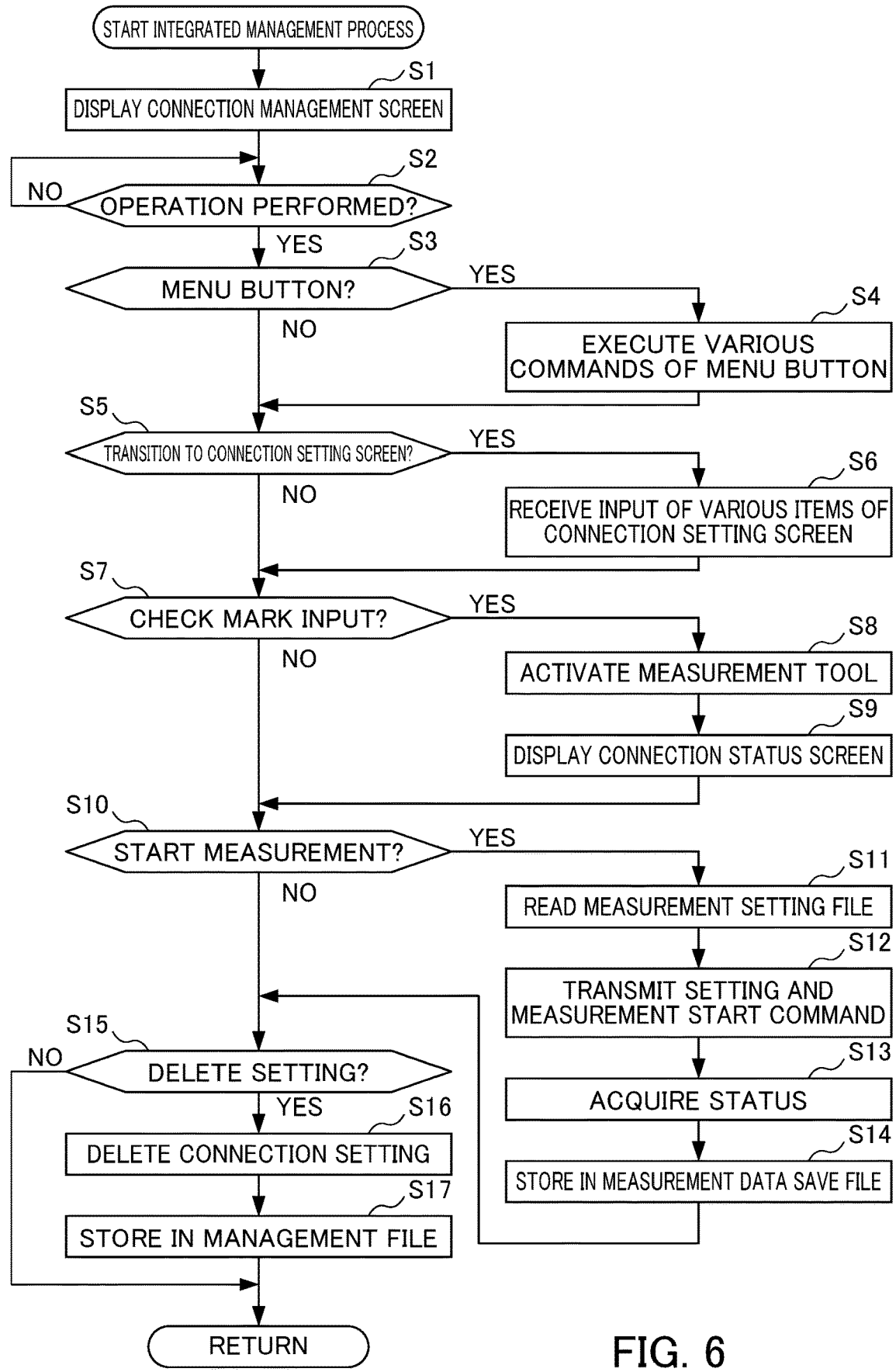
FIG. 6 is a flowchart illustrating the flow of an integrated management process executed by a data collection management device.

FIG. 6 is a flowchart illustrating the flow of an integrated management process executed by the data collection management device 10. The integrated management process starts when an instruction to activate the integrated management process is input via the input unit 14.

When the integrated management process starts, in step S1, the UI display control unit 11a displays the connection management screen. In step S2, the UI display control unit 11a determines whether an operation is performed on the connection management screen. When an operation is not performed on the connection management screen, a determination result of NO is obtained in step S2 and the process of step S2 is repeated. On the other hand, when an operation is performed on the connection management screen, a determination result of YES is obtained in step S2 and the flow proceeds to step S3.

In step S3, the UI display control unit 11a determines whether the operation on the connection management screen is an operation on the menu button. When the operation on the connection management screen is an operation on the menu button, a determination result of YES is obtained in step S3 and the flow proceeds to step S4. On the other hand, when the operation on the connection management screen is not an operation on the menu button, a determination result of NO is obtained in step S3 and the flow proceeds to step S5.

In step S4, the UI display control unit 11a executes various commands corresponding to the content of the operation on the menu button. In step S5, the UI display control unit 11a determines whether the operation on the connection management screen is an operation of instructing transition to the connection setting screen. When the operation on the connection management screen is an operation of instructing transition to the connection setting screen, a determination result of YES is obtained in step S5 and the flow proceeds to step S6. On the other hand, when the operation on the connection management screen is not the operation of instructing transition to the connection setting screen, a determination result of NO is obtained in step S5 and the flow proceeds to step S7.

In step S6, the UI display control unit 11a receives the input of various items in the connection setting screen. When the "OK" button is operated in step S6, the flow proceeds to step S7 by applying the input settings to the measurement setting file. On the other hand, when the "Cancel" button is operated in step S6, the flow proceeds to step S7 without applying the input setting to the measurement setting file.

In step S7, the UI display control unit 11a determines whether the operation on the connection management screen is the input of a check mark to the checkbox. When the operation on the connection management screen is the input of a check mark to the checkbox, a determination result of YES is obtained in step S7 and the flow proceeds to step S8. On the other hand, when the operation on the connection management screen is not the input of a check mark to the checkbox, a determination result of NO is obtained in step S7 and the flow proceeds to step S10.

In step S8, the measurement tool execution management unit 11c activates a measurement tool corresponding to the machine tool 20 on the basis of the connection setting of the machine tool 20 for which a check mark is input. In step S9, the UI display control unit 11a displays a connection status screen according to the connection state of the measurement tool. In step S10, the UI display control unit 11a determines whether the operation on the connection management screen is an operation on the "start measurement" button. When the operation on the connection management screen is an operation on the "start measurement" button, a determination result of YES is obtained in step S10 and the flow proceeds to step S11.

On the other hand, when the operation on the connection management screen is not the operation on the "start measurement" button, a determination result of NO is obtained in step S10 and the flow proceeds to step S15.

In step S11, the measurement tool execution management unit 11c reads a measurement setting file of the machine tool 20 which has succeeded in connection. In step S12, the measurement tool execution management unit 11c transmits the setting based on the measurement setting file for the machine tool 20 and a measurement start command using the measurement tool. In step S13, the measurement tool execution management unit 11c acquires a measurement status (measuring, the presence of an error, or the like) from the machine tool 20 using the measurement tool. In step S14, the measurement tool execution management unit 11c stores the measurement data acquired from the machine tool 20 in the measurement data save file using the measurement tool.

In step S15, the UI display control unit 11a determines whether the operation on the connection management screen is an operation on the "delete setting" button. When the operation on the connection management screen is an operation on the "delete setting" button, a determination result of YES is obtained in step S15 and the flow proceeds to step S16. On the other hand, when the operation on the connection management screen is not the operation on the "delete setting" button, a determination result of NO is obtained in step S15 and the integrated management process is repeated. In step S16, the setting management unit 11b deletes the selected connection setting. In step S17, the setting management unit 11b stores the management file by applying the deletion of the connection setting to the management file. After step S17, the integrated management process is repeated.

As described above, in the data collection management system 1 according to the present embodiment, the data collection management device 10 performs connection settings stored therein and setting of the types of measurement data with respect to the measurement tool corresponding to each of the plurality of machine tools 20 and executes measurement of each of the machine tools 20 using the measurement tool. Due to this, in the data collection management system 1, the user can manage the plurality of machine tools 20 using the data collection management device 10 in an integrated manner. Therefore, according to the data collection management system 1, it is possible to alleviate the work load of managing the plurality of machine tools 20 more appropriately.

In the data collection management system 1 according to the present embodiment, the measurement tool execution management unit 11c of the data collection management device 10 acquires measurement data on the machine tool 20. Therefore, the data collection management device 10 can manage the measurement data of each of the machine tools 20.

In the data collection management system 1 according to the present embodiment, the data collection management device 10 includes the measurement tool corresponding to each of the machine tools 20. Therefore, the data collection management device 10 can activate the measurement tool of the machine tool 20 and control measurement of data on the machine tool 20 directly.

In the data collection management system 1 according to the present embodiment, the data collection management device 10 includes the UI display control unit 11a that displays an interface screen (the connection management screen or the like) for controlling the connection settings on the measurement tool and the setting of the types of the measurement data and execution of the measurement on the respective machine tools 20 by the measurement tool. The UI display control unit 11a displays the machine tools 20 serving as measurement targets on the interface screen as a list, and when an item of the machine tool 20 displayed as the list is selected, processes related to setting on the measurement tool corresponding to the machine tool. 20, connection by communication with the machine tool 20, or measurement on the machine tool 20 are executed. In this way, the user can perform processes related to setting on the measurement tool corresponding to the machine tool 20, connection by communication with the machine tool, or measurement on the machine tool with a simple operation.

In the data collection management system 1 according to the present embodiment, the UI display control unit 11a receives addition and deletion of the machine tool 20 serving as the measurement target on the interface screen. In this way, even when the number of machine tools 20 serving as the measurement target increases or decreases, it is possible to set an integrated management target machine tool 20 with a simple operation.

Modification 1

Figure 7:
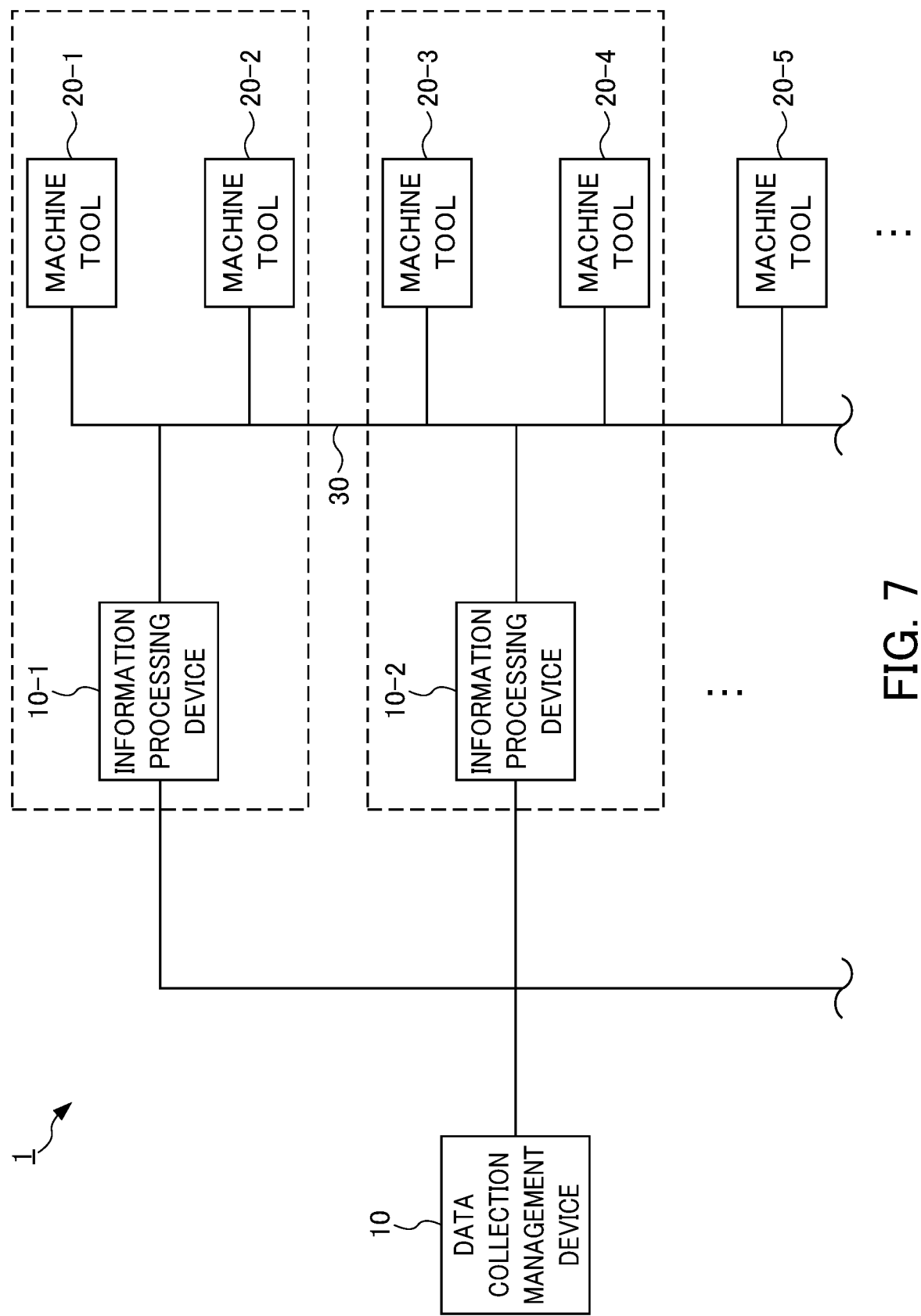
FIG. 7 is a schematic diagram illustrating a system configuration of a data collection management system in which a measurement tool and a measurement tool execution management unit are provided in different information processing devices.

In the above-described embodiment, it has been described that the data collection management device 10 includes the measurement tool and the measurement tool execution management unit 11c. In contrast, the data collection management device 10 may include the measurement tool execution management unit 11c, and an information processing device different from the data collection management device 10 may include the measurement tool. FIG. 7 is a schematic diagram illustrating a system configuration of the data collection management system 1 in which the measurement tool and the measurement tool execution management unit 11c are provided in different information processing devices.

As illustrated in FIG. 7, information processing devices 10-1 to 10-m (m is an integer of 2 or more) each including a plurality of measurement tools corresponding to a plurality of predetermined machine tools 20 (for example, machine tools 20 within a dash line) may be provided in each of the plurality of machine tools 20, and the data collection management device 10 may manage the measurement tools provided in the plurality of information processing devices 10-1 to 10-m via the network 30 in an integrated manner. In such a configuration, the processing load of the data collection management system 1 can be distributed.

Modification 2

Figure 8:
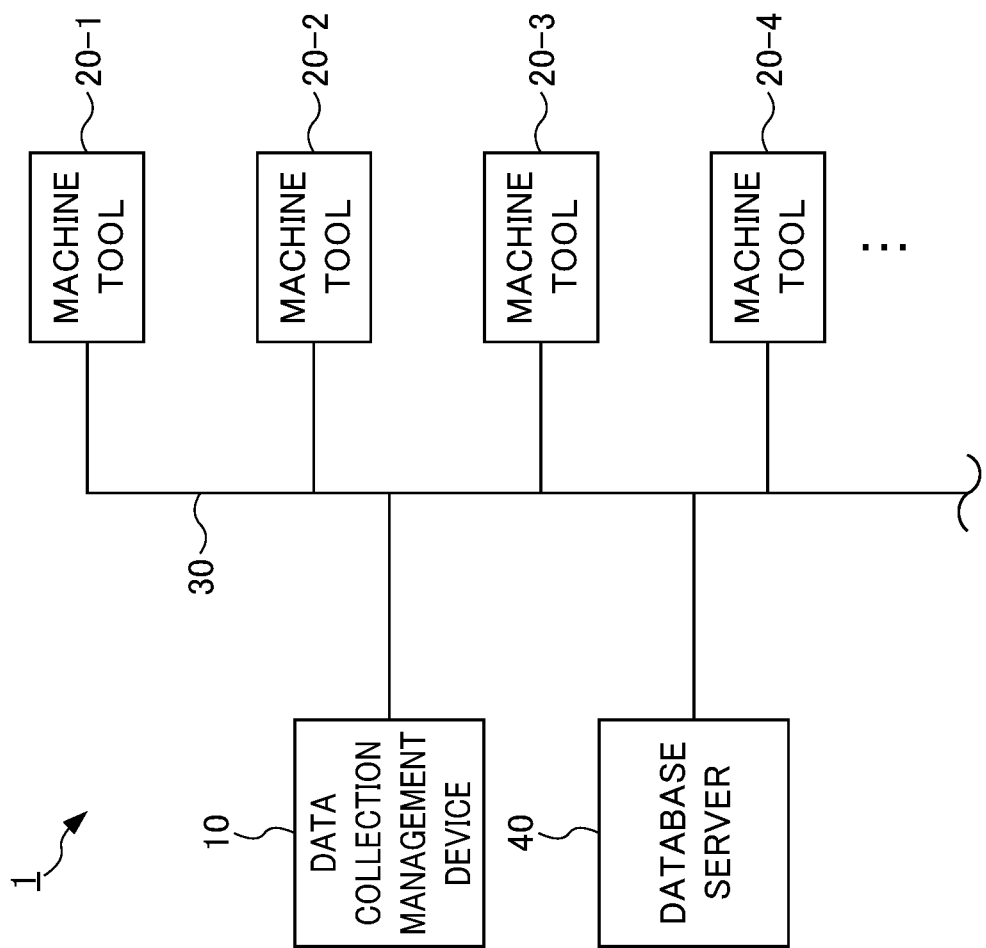
FIG. 8 is a schematic diagram illustrating a system configuration of a data collection management system in which a measurement data save file is stored in a storage device on a network.

In the above-described embodiment, it has been described that the data collection management device 10 stores the measurement data save file for storing the measurement data. In contrast, the measurement data save file may be stored in a storage device on the network 30. FIG. 8 is a schematic diagram illustrating a system configuration of the data collection management system 1 in which the measurement data save file is stored in a storage device on the network 30.

As illustrated in FIG. 8, the data collection management system 1 may include a database server 40 that can communicate with the data collection management device 10 via the network 30, and the data collection management device 10 may store the measurement data acquired using the measurement tool in a measurement data save file stored in the database sever 40. In such a configuration, it is possible to distribute the processing load of the data collection management device 10 and use the measurement data from respective devices easily.

Modification 3

In the above-described embodiment, when a new machine tool is added as an integrated management target, the data collection management device 10 may acquire a measurement tool set in advance for the machine tool, extract settings from the measurement tool, and add a measurement setting file and a management file for the integrated management process automatically. In this case, it is possible to add the machine tool 20 as an integrated management target of the data collection management system 1 easily.

In the above-described embodiment, although the position of the machine moving part (a servo shaft) driven by the servomotor and the position of a main shaft (a spindle shaft) driven by the spindle motor are described as an example of a measurement target of the measurement tool, the measurement target is not limited thereto. That is, various parameters of the machine tool may be used as the measurement target of the measurement tool. Various functions of the data collection management device 10 can be installed in a plurality of information processing devices of the data collection management system 1 in a distributed manner, and the integrated management function may be realized by the data collection management system 1 as a whole. The data collection management device 10 or the information processing devices 10-1 to 10-*m* may perform integrated management with respect to the machine tools 20 provided outside the data collection management system 1 rather than including the machine tools 20 in the data collection management system 1 of the present embodiment.

All or some of the functions of the data collection management system 1 of the above-described embodiment may be realized by hardware, software, or a combination thereof. Here, the function being realized by software means that the function is realized when a processor reads and executes a program. When the function is realized by hardware, some or all of the functions of the data collection management system 1 may be realized by an integrated circuit (IC) such as an application specific integrated circuit (ASIC), a gate array, a field programmable gate array (FPGA), or a complex programmable logic device (CPLD), for example.

When all or some of the functions of the data collection management system 1 are realized by software, the function can be realized when a computer including a storage unit such as a hard disk or ROM, storing a program that describes all or some of the operations of the data collection management system, a DRAM storing data necessary for computation, a CPU, and a bus connecting respective units stores information necessary for computation in the DRAM and causes the CPU to operate the program.

These programs may be stored in various types of computer readable media and be supplied to the computer. The computer readable media include various types of tangible storage medium. Examples of the computer readable media include a magnetic storage medium (for example, a flexible disk, a magnetic tape, and a hard disk drive), a magneto-optical storage medium (for example, a magneto-optical disc), a read only memory (CR-ROM), a CD-R, a CD-R/W, and a semiconductor memory (for example, a mask ROM, a programmable ROM (PROM), an erasable PROM (EPROM), a flash memory, and a random access memory (RAM)). These programs may be distributed by being downloaded to a computer of a user via a network.

While the embodiment of the present invention has been described in detail, the above-described embodiment is a specific example of carrying out the present invention. The technical scope of the present invention is not limited to the embodiment. Various changes can be made in the present invention without departing from the spirit thereof, and these changes fall within the technical scope of the present invention.

EXPLANATION OF REFERENCE NUMERALS

1: Data collection management system
10: Data collection management device
11: CPU
11*a*: UI display control unit
11*b*: Setting management unit
12*c*: Measurement tool execution management unit
12: ROM
13: RAM
14: Input unit
15: Display unit
16: Storage unit
17: Communication unit
10-1 to 10-*n*: Information processing device
20, 20-1 to 20-*n*: Machine tool
30: Network
40: Database server

What is claimed is:

1. A data collection management system including a data collection management device that manages acquisition of measurement data of a plurality of machine tools, wherein
the data collection management device, which is connected communicably to the plurality of machine tools via a network or by a communication cable, includes:
a setting storage unit that stores connection settings for connecting communicably to the plurality of machine tools and setting of types of measurement data measured in each of the machine tools, the measurement data being data representing physical machine tool characteristics;
a setting unit that sets the connection settings and the types of the measurement data to a measurement tool corresponding to each of the machine tools; and
an execution management unit that controls the machine tools by activating the measurement tool and starts to execute measurement of each of the machine tools according to the settings performed by the setting unit so that the execution management unit acquires the measurement data from the respective machine tools,
wherein the connection between the data collection management device and the plurality of machine tools is configured so that the measurement data is transmitted from the respective machine tools back to the data collection management device.

2. The data collection management system according to claim 1, wherein
the data collection management device includes:
a measurement data acquisition unit that acquires the measurement data on the machine tool.

3. The data collection management system according to claim 1, wherein
the data collection management device includes the measurement tool corresponding to each of the machine tools.

4. The data collection management system according to claim 1, further comprising:
an information processing device that manages acquisition of the measurement data on one or some of the machine tools among the plurality of machine tools, wherein
the information processing device includes the measurement tool corresponding to one or some of the machine tools among the plurality of machine tools.

5. The data collection management system according to claim 1, wherein
the data collection management device includes:
a display control unit that displays an interface screen for controlling the setting unit performing the connection settings and the setting of the types of the measurement data to the measurement tool and controlling the measurement tool executing measurement on the respective machine tools, and
the display control unit displays the machine tools serving as measurement targets on the interface screen as a list, and when an item of the machine tools displayed as the list is selected, processes related to setting on the measurement tool corresponding to the machine tool, connection by communication with the machine tool, or measurement on the machine tool are executed.

6. The data collection management system according to claim 5, wherein the display control unit receives addition and deletion of the machine tool serving as the measurement target on the interface screen.

7. A data collection management method executed in a data collection management system including a data collection management device that manages acquisition of measurement data of a plurality of machine tools, wherein
the data collection management device, which is connected communicably to the plurality of machine tools via a network or by a communication cable, executes:
a setting step of setting connection settings for connecting communicably to the plurality of machine tools and setting types of measurement data measured in each of the machine tools to a measurement tool corresponding to each of the machine tools, the measurement data being data representing physical machine tool characteristics; and
an execution management step of controlling the machine tools by activating the measurement tool and starting to execute measurement on each of the machine tools according to the settings performed in the setting step so that the execution management step includes acquiring the measurement data from the respective machine tools,
wherein the connection between the data collection management device and the plurality of machine tools is configured so that the measurement data is transmitted from the respective machine tools back to the data collection management device.

8. A non-transitory computer-readable storage medium having a program recorded thereon, the program causing a computer that forms a data collection management device that is connected communicably to the plurality of machine tools via a network or by a communication cable and manages acquisition of measurement data on a plurality of machine tools to realize:
a setting function of setting connection settings for connecting communicably to the plurality of machine tools and setting types of measurement data measured on each of the machine tools to a measurement tool corresponding to each of the machine tools, the measurement data being data representing physical machine tool characteristics; and
an execution management function of controlling the machine tools by activating the measurement tool and starting to execute measurement on each of the machine tools according to the settings performed in the setting step so that the execution management function includes acquiring the measurement data from the respective machine tools,
wherein the connection between the data collection management device and the plurality of machine tools is configured so that the measurement data is transmitted from the respective machine tools back to the data collection management device.

9. The data collection management system according to claim 1, wherein the setting storage unit stores various settings of individual measurement tools in measurement setting files.

10. The data collection management system according to claim 1, wherein the setting storage unit stores measurement data in measurement data save files that are set for respective measurement tools.

11. The data collection management system according to claim 1, wherein the setting storage unit stores information for managing an integrated management process executed by the data collection management device in a management file.

* * * * *